(12) United States Patent
Baerenweiler et al.

(10) Patent No.: US 6,987,447 B2
(45) Date of Patent: Jan. 17, 2006

(54) METHOD OF OPERATING AN ACTIVE OBSTACLE WARNING SYSTEM

(75) Inventors: Josef Baerenweiler, Zirndorf (DE); Guenther Fendt, Schrobenhausen (DE); Helmut Riedel, Fuerstenfeldbruck (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 137 days.

(21) Appl. No.: 10/781,337

(22) Filed: Feb. 17, 2004

(65) Prior Publication Data

US 2004/0183662 A1 Sep. 23, 2004

Related U.S. Application Data

(63) Continuation-in-part of application No. PCT/DE02/02865, filed on Jul. 31, 2002.

(30) Foreign Application Priority Data

Aug. 16, 2001 (DE) ................................. 101 40 096

(51) Int. Cl.
*B60Q 1/00* (2006.01)

(52) U.S. Cl. ...................... 340/435; 340/903; 340/933; 340/436

(58) Field of Classification Search ................ 340/435, 340/436, 903, 901, 904, 942, 938, 933; 367/99, 367/909; 307/10.1; 701/301
See application file for complete search history.

(56) References Cited

U.S. PATENT DOCUMENTS

| | | | | |
|---|---|---|---|---|
| 5,122,796 A | * | 6/1992 | Beggs et al. ................ | 340/904 |
| 5,463,384 A | * | 10/1995 | Juds ........................... | 340/903 |
| 5,929,784 A | * | 7/1999 | Kawaziri et al. ........... | 340/903 |
| 6,771,103 B2 | * | 8/2004 | Watanabe et al. ........... | 327/161 |

FOREIGN PATENT DOCUMENTS

| | | |
|---|---|---|
| DE | 3903501 | 8/1989 |
| DE | 19707936 | 9/1998 |
| EP | 0569686 | 11/1993 |
| WO | WO00/54070 | 9/2000 |
| WO | WO99/60629 | 3/2001 |

* cited by examiner

*Primary Examiner*—Daryl C Pope
(74) *Attorney, Agent, or Firm*—W. F. Fasse; W. G. Fasse

(57) ABSTRACT

From a prescribed starting value, the emitting power of an obstacle detection beam increases or decreases according to a prescribed function at a prescribed rate. The received signal reflected from an obstacle is compared to a prescribed threshold. Once the received reflected power rises or falls to the threshold, the emitting power is not further increased or decreased respectively, but is maintained constant. Thereby, consumed and dissipated power is reduced, unnecessary excessive power use is avoided, and the detection range of the obstacle detection beam is adapted to the prevailing situation.

24 Claims, 4 Drawing Sheets

METHOD OF OPERATING AN ACTIVE OBSTACLE WARNING SYSTEM

CROSS-REFERENCE TO RELATED APPLICATION

This application is a Continuation-In-Part under 35 U.S.C. §111(a) and §120 of PCT International Application PCT/DE02/02865, filed on Jul. 31, 2002, which designated the United States, and which was published in a language other than English. The entire disclosure of that PCT International Application is incorporated herein by reference.

PRIORITY CLAIM

Through the above identified PCT International Application, this application is based on and claims the priority under 35 U.S.C. §119 of German Patent Application 101 40 096.9, filed on Aug. 16, 2001. The entire disclosure of the German Priority Application is incorporated herein by reference.

1. Field of the Invention

The invention relates to a method of detecting an obstacle and particularly a method of operating an active obstacle warning system that serves to detect the presence of, and measure a distance to, a target object generally called an obstacle herein.

2. Background Information

In order to improve the safety of motor vehicle traffic, it is becoming evermore common to install obstacle warning systems in motor vehicles. These systems serve to support or assist the driver of the vehicle, by monitoring the environment around the motor vehicle, and especially the environment directly in front of the moving vehicle, in order to detect any sources of danger such as stationary or moving obstacles on the roadway in front of the vehicle. These systems further determine the spacing distance and the relative approaching speed between the subject vehicle and the obstacle, and warn the driver of the vehicle or even carry out an automatic braking of the vehicle if necessary, for example if the driver does not react to the warning in a timely fashion.

For monitoring the environment around the motor vehicle, obstacle warning systems based on laser or radar beams are being developed or are already being used. With these systems, the transit time of the emitted radiation, i.e. electromagnetic waves, and the resulting reflected signal received back from the obstacle is measured in order to determine the distance from the subject vehicle to the obstacle. By evaluating the change of this distance over time, the relative approaching speed can also be determined, especially when further taking into account the traveling speed of the subject vehicle. A major disadvantage of these known systems is that they can only provide distance and relative speed information regarding the obstacle, and cannot provide any further information for identifying the obstacle.

In such obstacle warning systems, the environment around the vehicle, and thus also any obstacle within the operating range in the vehicle's environment, is illuminated by light waves in the form of a radiation lobe or beam directed in the relevant direction (e.g. in front of the subject vehicle) for a prescribed time duration in a given single measuring cycle. Then, by measuring the transit time of the received reflected light portion, the spacing distance to the obstacle can be determined. In this context, one measuring cycle relates to one single continuous light pulse of a defined duration, or when using modulated light sources, one measuring cycle relates to a prescribed total duration of a succession of short light pulses. Due to the transit time of the emitted light, the reception of the reflected light is somewhat staggered or time delayed. Typically, a pause is provided between successive measuring cycles in which light beams are emitted, whereby this pause allows for the reception of the reflected light portion of a given single measuring cycle.

The PCT Publication WO 99/60629 A1 discloses a so-called photonic mixer device (PMD) sensor. Such a sensor arrangement is especially suited for optically monitoring the surrounding environment in front of a moving motor vehicle. As an advantage over the previously mentioned obstacle warning systems, this PMD sensor system has the advantage that it can also provide image information regarding a stationary or moving obstacle, in addition to the above described distance and speed information. A particularly suitable location for installing such a PMD sensor for an obstacle warning system in a motor vehicle is presented by one or more node points or assembly points on the headliner or ceiling in the interior of the motor vehicle. These locations provide a good unobstructed view of the area to be monitored in front of the vehicle. However, these locations also suffer the problem that they are subject to a high operating temperature, due to strong heating, especially under conditions of direct sunshine heating the roof and the interior of the motor vehicle cabin. Measurements have shown that environmental temperatures of 90° C. or higher can be reached at these locations. Under such high temperatures, the sensors of the obstacle warning system, and especially optical components thereof, are operated at the upper limit of their permissible operating temperature range. As a result, the operating efficiency of these components is significantly reduced due to an increased noise proportion in the signal, especially in consideration of the relatively low signal-to-noise ratio that typically applies in this context.

It has become known in obstacle warning systems, to provide a regulation of the emitting power, due to varying operating conditions in the operation of the motor vehicle, and especially in view of a fluctuating emitting power of the obstacle warning system and varying reflection and illumination characteristics of the surrounding environment of the vehicle. For example, the Patent Publications DE 39 03 501 and EP 0,569,686 A1 disclose a regulation of the light power of the emitter dependent on the received signal. Due to the transit time of the signal, however, the regulation is only carried out between successive individual measuring cycles and thus requires at least two measuring cycles in order to adjust the emitting power so as to optimally illuminate the surrounding environment and any obstacle present therein.

In this regard, the received signal of a prior measuring cycle is used to adjust the light power of a subsequent measuring cycle. This requires, however, that the surrounding environment does not change between successive measuring cycles, because otherwise, if the reflection characteristics or locations of obstacles change between successive measuring cycles, then the adjusted power level based on a reflection in a previous measuring cycle would no longer be suitable for the characteristics prevailing in the subsequent measuring cycle. Of course, such a lack of change in the surrounding environment between successive measuring cycles cannot be ensured for an obstacle warning system in a moving motor vehicle.

The PCT Publication WO 00/54070 discloses an obstacle warning system in which the emitting power is varied dependent on the direction in which the radiation beam is oriented. The German Patent Publication DE 197 07 936 A1 discloses an obstacle warning system in which the emitting power is varied dependent on the speed of the motor vehicle. According to these references, however, the emitting power remains constant during any given single measuring cycle with the radiation beam oriented in any given single direction.

SUMMARY OF THE INVENTION

In view of the above, it is an object of the invention to provide a method of detecting an obstacle and further a method of operating an active obstacle warning system, whereby the emitting power may be adjusted rapidly, simply, and in a situation-dependent manner. Furthermore, by operating the obstacle warning system with the lowest power necessary during a given measuring cycle in any particular situation, the operating temperature thereof is to be reduced, which is especially significant when the system or components thereof are located at the forward node points or assembly points of the ceiling or headliner of a motor vehicle. The invention further aims to avoid or overcome the disadvantages of the prior art, and to achieve additional advantages, as apparent from the present specification. The attainment of these objects is, however, not a required limitation of the present invention.

The above objects have been achieved according to the invention in a method of detecting an obstacle as well as a method of operating an active obstacle warning system. The inventive method includes the steps: emitting electromagnetic radiation in the form of a radiation beam in a beam direction in a respective measuring cycle for a prescribed time duration; receiving as a reflected signal a reflected portion of the radiation beam that is reflected from an obstacle located in the path of the radiation beam; evaluating the reflected signal to determine the presence of the obstacle (i.e. whether the obstacle is present) and a spacing distance to the obstacle; and varying the emitting power of the emitted electromagnetic radiation during the time duration of the respective measuring cycle in a situation-dependent manner. Particularly and preferably according to the invention, the varying of the emitting power involves increasing or reducing the emitting power during the measuring cycle according to a previously defined power variation protocol, e.g. including a prescribed starting value and a prescribed rate or slope of increasing or decreasing. Further preferably, the variation of the emitting power continues until the received magnitude or power of the received reflected signal reaches a prescribed desired or nominal value (i.e. a prescribed threshold), at which point the emitting power is then continued at a constant power level. The power variation protocol may also include changes of the power variation as a function of time, for example changing the rate or slope of power increase after a certain elapsed time. The starting value of the emitting power may be either zero or some predetermined positive nominal value regarded as a 100% normal operating power level.

The inventive method is generally based on carrying out an adaptation of the emitting power of the obstacle warning system during or within the time duration of a given respective measuring cycle. This means that the adaptation, i.e. the adjustment or variation, of the emitting power begins already before or during the reception of the reflected signal. Furthermore, the adaptation of the emitting power is initially carried out based on a previously prescribed power variation protocol, and the adaptation is then changed or terminated based on the received magnitude of the reflected signal. Thus, the adaptation generally is carried out without a direct feedback from the received reflected signal, and is thereby fundamentally different from the previous conventional emitting power regulation methods based on a direct feedback in this manner.

A significant advantage of the inventive automatic prescribed adaptation of the emitting power is that this adaptation can take place directly during a given respective measuring cycle. In this context, the inventive adaptation of the emitting power does not require and is not directly based on information determined during one or more previous measuring cycles. Optionally, however, the inventive prescribed power variation protocol may determine merely the starting value and the direction, i.e. the increasing or decreasing, of the power variation based on the previous measuring cycle or cycles.

The power adaptation, i.e. the variation of the emitting power, proceeds automatically, namely the emitting power is continuously varied along a prescribed characteristic curve or power function, for example varying linearly over time. In this context, if modulated light waves including discrete individual light pulses make up the overall measuring cycle, the power adaptation will be achieved through successive power steps or stages of the successive discrete individual pulses, which will then represent a corresponding envelope curve of all of the pulses, whereby the envelope curve corresponds to the prescribed characteristic curve or function.

Such a power adaptation during a given respective measuring cycle achieves several advantages. First, for any particular operating situation, the emitting power can be reduced to the minimum power necessary for achieving the obstacle detection. Thereby, without diminishing the operational readiness or effectiveness, the dissipated power of the obstacle warning system can be reduced, for example by reducing the voltage supply, whereby as a result the operating temperature of the electronics is also reduced. As a result, the reduced operating temperature leads to an increased operating lifetime of the obstacle warning system, because its components are not loaded or taxed as significantly. Furthermore, if needed in a particular situation, the emitting power can be temporarily increased so as to enlarge the monitoring or detection range of the system, so as to detect and warn of obstacles at a greater distance and at an earlier time. Also thereby, the functionality and reliability of the obstacle warning system can be maintained in situations of particularly intensive sunshine or during high-speed driving. For these reasons, the inventive method is especially suitable for operating an obstacle warning system in a motor vehicle.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1A:
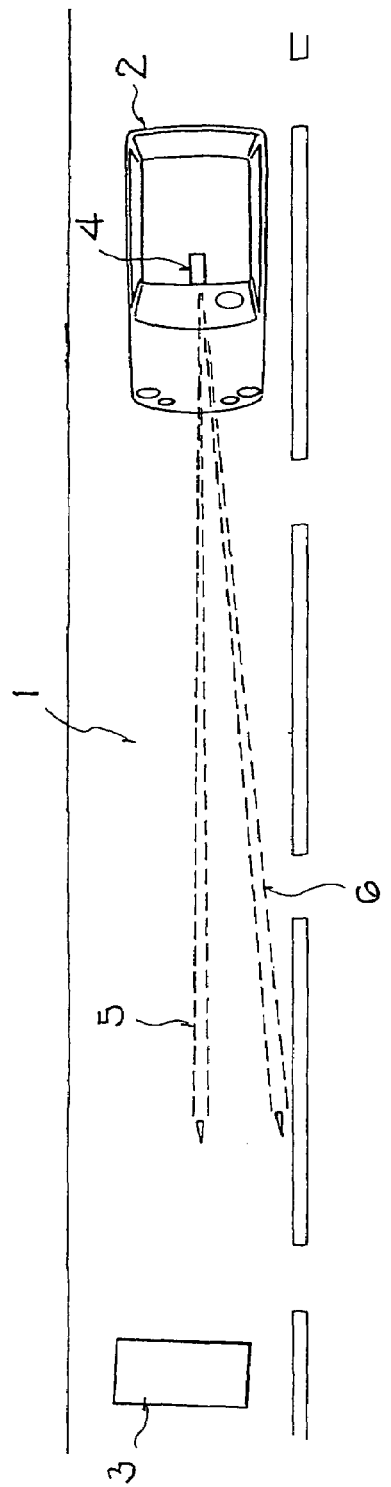
FIG. 1A is a schematic top plan view of an obstacle warning system operating with a basic power setting in a motor vehicle driving on a roadway, whereby the range of the radiation beams of the system is schematically illustrated with dashed lines.

The top plan view of FIG. 1A schematically shows a motor vehicle 2 driving on a roadway 1 toward a stationary or moving obstacle 3. An obstacle warning system 4 is installed in the vehicle 2, and particularly preferably at an assembly point in the middle of the front of the ceiling or headliner of the vehicle 2. The obstacle warning system 4 emits electromagnetic waves forming at least two directed radiation lobes or beams 5 and 6 generally oriented in the forward driving direction of the vehicle 2. The obstacle warning system 4 may preferably comprise a photo mixing detector or photonic mixer device (PMD) sensor disclosed in the PCT Publication WO 99/60629 A1. Alternatively, the obstacle warning system 4 may comprise any other known device, components, or arrangement for detecting obstacles using at least one emitted radiation beam.

In any event, this system 4 serves to detect the obstacle 3, and measure the distance from the vehicle 2 to the obstacle 3 by evaluating a received reflected signal that arises as a portion of the electromagnetic waves being reflected from the obstacle 3. This evaluation of the reflected signal, and the determination of the spacing distance to the obstacle 3, may involve measuring the transit time of the emitted signal and the received reflected signal, or evaluating the phase information of the received reflected signal, for example. The emitted electromagnetic waves may, for example, be light waves such as infrared light waves, or any other conventionally known electromagnetic radiation suitable for use in such an obstacle warning system.

The first radiation beam 5 of the obstacle warning system 4 is oriented in a direction straight ahead in front of the vehicle 2. The second radiation beam 6 is oriented at an angle a few degrees away from the straight-ahead forward direction, namely being angled slightly toward the left, i.e. toward the middle of the roadway 1 and thus slightly toward the oncoming traffic lane. The two radiation beams 5 and 6 both have approximately the same range with the basic emitting power setting illustrated here as an example, namely both beams 5 and 6 are emitted with the same power.

The two radiation beams 5 and 6 can be emitted simultaneously, alternately, sequentially one after the other, or in some other time sequence. Instead of two radiation beams 5 and 6 as illustrated in this example, the system 4 could alternatively emit only a single radiation beam or more than two radiation beams.

Figure 1B:
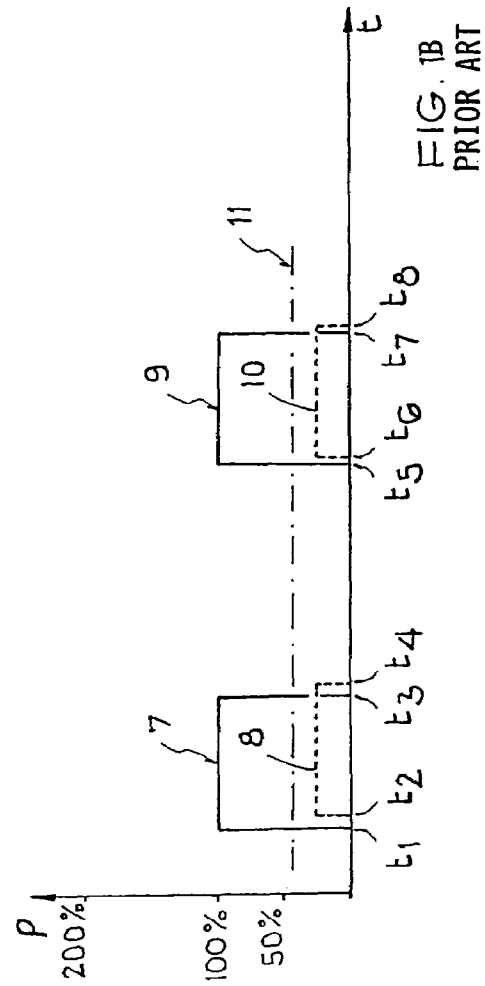
FIG. 1B graphically illustrates the emitting power and the received reflection power of the two radiation beams over time, with a fixed non-varying basic power setting according to the prior art.

FIG. 1B is a schematic diagram representing the emitting power level over time, according to the basic power setting of the radiation beams 5 and 6 as illustrated in FIG. 1A. Particularly, this basic setting, i.e. this characteristic of the power level over time, is according to the prior art, in which the emitting power remains at a constant power level for each beam's emission period during an entire measuring cycle. Thus, FIG. 1B shows a representative power curve 7 of the emitting power of the radiation beam 5, as well as a curve 8 showing the received reflected signal arising as a reflection of some of the power of the radiation beam 5 from the obstacle 3. Further, FIG. 1B similarly shows a power curve 9 representing the emitting power of the radiation beam 6, together with the associated received reflected signal 10. A prescribed or pre-adjusted nominal value of a threshold for evaluating the received reflected signals 8 and 10 is shown by the curve or threshold line 11.

Referring in more detail to FIG. 1B, the radiation beam 5 is emitted with a relative emitting power of 100% from a time point t1 until a time point t3. This emission of the radiation beam 5 is illustrated by the power curve 7. As a result of the radiation beam 5 being reflected back from the environment in front of the vehicle, a reflected signal shown by the curve 8 is received by the obstacle warning system 4 from the time point t2 until the time point t4. Thereby, as can be seen, the received reflected power is, for example, only about 50% of the pre-adjusted nominal value according to the threshold line 11. Also, the received reflected signal 8 has a time offset or delay relative to the emission of the radiation beam 5, as seen in the time lag between the time points t1 and t2 and correspondingly between the time points t3 and t4. This time lag corresponds to the transit time of the emitted signal and the returned reflected signal.

Thereafter, from a time point t5 until a time point t7, the radiation beam 6 is emitted with an emitting power of 100% according to the power curve 9. A corresponding reflection thereof from the outside environment is received by the obstacle warning system 4 according to the associated reflected signal curve 10 from the time point t6 until the time point t8. Also 5 in this case, the power level of the received reflected signal 10 is only about 50% of the predetermined nominal value or threshold line 11.

The emission of a radiation beam 5 or 6 and the reception of the associated reflected signal has a duration of approximately 500 $\mu$s, according to the present example. Thus, when two radiation beams 5 and 6 are emitted successively, and further accounting for the switch-over and dead times between the respective emission of the two radiation beams 5 and 6, a total cycle time for a cycle of the two radiation beams has a duration of about 1 ms. After the time point t8, and if applicable a switch-over time, the emission of the radiation beams 5 and 6 and the reception and measurement of the respective associated reflected signals will be repeated. According to the prior art, only after the emission and reception of the radiation beams is repeated, can the emitting power of the radiation beams be correspondingly adjusted or adapted to the conditions that were determined in connection with the previous measuring cycle. In any event, as shown in FIG. 1B, in the respective single measuring cycle as illustrated, the power level of the radiation beam 5 remains constant during its emission period from time point t1 to time point t3 as shown by the power curve 7, and similarly the power level of the radiation beam 6 remains constant during its emission period from time point t5 to time point t7 as shown by the corresponding power curve 9.

In contrast to the prior art as discussed above, the inventive method involves emitting the radiation beams 5 and 6 with a varying power level of the emitting power, instead of a constant relative emitting power of 100% as shown in the prior art FIG. 1B. Particular details and different embodiments of the inventive method will be described below in connection with FIGS. 2A, 2B, 3A, 3B, 4A and 4B. Generally according to the invention, the emitting power of the obstacle warning system 4 may be reduced during a single respective measuring cycle in order to reduce the operating temperature of the obstacle warning system, or in order to provide an emergency operating mode. Alternatively, the emitting power of the radiation beam may be increased during a single respective measuring cycle in order to increase the detection range of the modulated light waves making up the radiation beam, or in the case of intense sunshine, so that the emitted signal is effective over the background noise caused by the sunshine. Upon studying the present disclosure of the invention, a person skilled in this art will recognize further situations in which the emitting power of the obstacle warning system 4 can be advantageously reduced or increased during a measuring cycle.

Figure 2A:
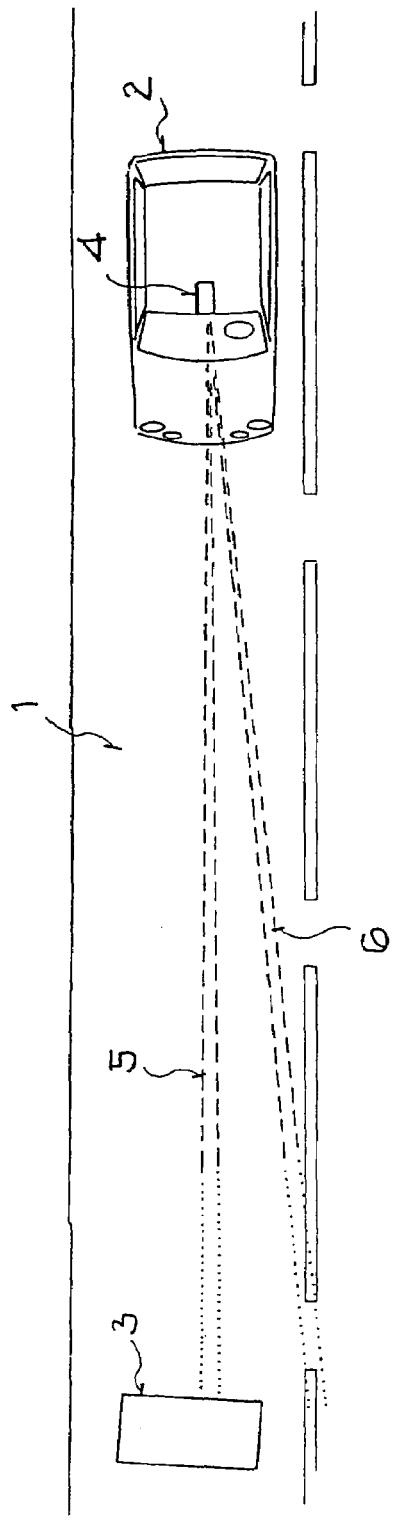
FIG. 2A is a view similar to FIG. 1A, but showing the increased range of the radiation beams with dotted lines, achieved by means of an emitting power adjustment or adaptation according to the invention.

FIG. 2A is a schematic illustration of a vehicle 2 driving on a roadway 1 toward a stationary or moving obstacle 3, generally similar to FIG. 1A. However, here in FIG. 2A, the detection range of the obstacle warning system 4 in the vehicle 2 has been increased by increasing the emitting power of the radiation beams 5 and 6. In comparison to the example of FIGS. 1A and 1B, here the radiation beams 5 and 6 are not emitted with a constant power level, but instead the emitting power is varied, and particularly increased, during the emitting period or duration of, for example, 500 μs. More particularly, the emitting power begins from a pre-specified starting value, e.g. a relative emitting power of 100% in this example, and is then increased according to a prescribed increase rate or slope (e.g. linearly) while evaluating the power level of the received reflected signal, until the reflection value reaches a prescribed nominal value or threshold. At that time, the emitting power may then be switched to a constant value that is maintained to the end of the emitting period or at least as long as the reflection value remains at or above the prescribed threshold value. By means of this operating mode, which is typically only carried out for a short time, the detection range of the radiation beams 5 and 6 can be temporarily increased when no obstacle 3 is being detected, in order to potentially detect more-distant obstacles 3 at an earlier time.

In this context in FIG. 2A, the basic detection range of the radiation beams 5 and 6 with the basic power setting of 100% emitting power is represented by dashed lines, while the increased detection range with an increased emitting power is represented with dotted lines. It is apparent in FIG. 2A that the radiation beam 5 is able to reach and detect (with sufficient operating power) the obstacle 3 only with its increased range at an increased power level, but not at its base range with the base power level. It is also apparent that the second radiation beam 6 does not detect the obstacle 3, because its beam direction does not impinge on the obstacle 3 in this example.

Figure 2B:
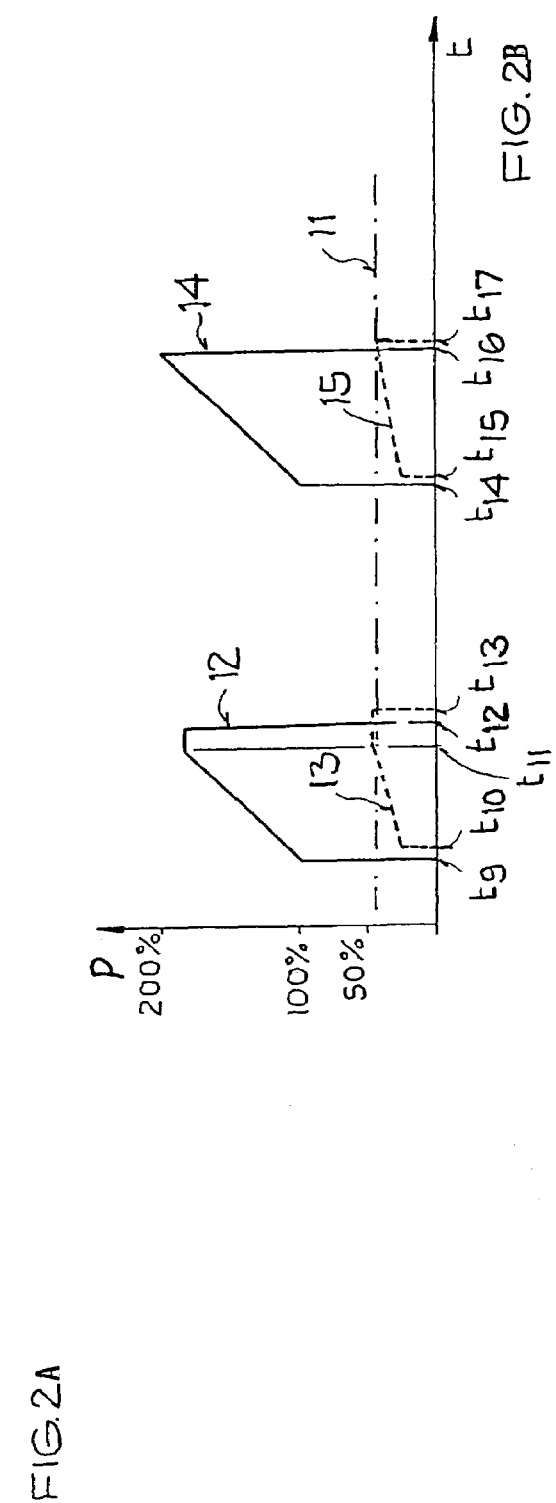
FIG. 2B is a graph of power versus time similar to FIG. 1B, but showing the increase of the emitting power and the received reflection during a given respective measuring cycle according to the inventive method in connection with FIG. 2A.

FIG. 2B shows the details of the power of the emitted beams as well as the arising reflections over time, for the situation of FIG. 2A. Particularly, the emitting power of the radiation beam 5 is shown by the power curve 12, while the associated reflection is shown by the power curve 13. The emitting power of the radiation beam 6 is shown by the power curve 14, and the associated reflection is shown by the power curve 15. It should be understood that these curves may represent the power value of a continuously emitted light beam, or may represent the envelope curve of a plurality of successive individual pulses of a modulated light wave. This is true for all of the inventive examples disclosed herein. Once again, a pre-adjusted or pre-defined nominal threshold value for evaluating the reflection curves 13 and 15 is shown by the threshold value line 11.

The radiation beam 5 is emitted according to the power curve 12 from the time point t9 until the time point t12, beginning from a starting value at time point t9 with a relative emitting power of 100%. This 100% power level is selected in this example to mean the power level of normal operation for the normal base detection range as discussed above in connection with FIGS. 1A and 1B. This starting value can be prescribed by a predefined power variation protocol, which specifies the starting value to be used, either based on a fixed starting value specification, or based on information obtained in one or more preceding measuring cycles. The predefined power variation protocol also specifies the direction and rate of variation of the emitting power over time, starting from this starting value.

In the present example, the emitting power is to be increased linearly at a predefined increasing rate or slope according to a prescribed first power function from the starting value at time point t9. Alternatively, the power increase could be carried out according to an exponential function or some other function rather than a linear function. As a further alternative, the first power function applicable beginning from the starting value at t9 could be a constant function or a decreasing function. This pre-specified first power function applies for controlling the emitting power level before the system has received any reflection feedback information from the reflection in the respective present measuring cycle. Once the reflected signal 13 is received and evaluated at t10, the control of the emitting power may be switched from this pre-specified first power function to a pre-specified second power function in response to and dependent on the result of the evaluation, as will be described next.

Once the associated reflected signal 13 is received at time point t10 after a short time delay due to the transit time, the received reflected power level is compared to the predefined nominal value of the power threshold line or curve 11. In this example, since the received reflected signal according to power curve 13 is below, i.e. does not reach, the prescribed threshold value 11, the emitting power continues to be increased according to the predefined increasing rate along power curve 12. This can be embodied as continuing the control according to the initial first power function, or as proceeding with the control of the emitting power according to a predefined second power function that specifies the increase of the emitting power 12 when the received reflected signal 13 falls below the threshold 11. Corresponding to the increase of the emitting power, the detection range of the radiation beam 5 is also increased, whereby a further distant obstacle 3 can be detected and recognized, in comparison to the detection range provided by the basic power setting with a constant relative emitting power of 100%.

As soon as the received reflected signal 13 arising from the reflection of the emitted radiation beam 5 reaches the predefined nominal threshold value 11, for example because the radiation beam 5 has now reached and impinged upon the obstacle 3, the emitting power of the emitted radiation beam 5 is not further increased, but rather is then switched to and maintained at a constant power level from the time point t11 until the end of the emitting period at time point t12. A further requirement in this regard could be that the received reflected power level remains at or above the predefined power threshold 11. The associated reflected signal 13 then ends after a time lag at the time point t13. In the above manner, the emitting power has been increased to a level at which the obstacle 3 can be detected at a greater range and thus an earlier time, without increasing the emitting power level to an unnecessary excessive level. Namely, once a sufficient power level for detecting the obstacle 3 is reached, then this power level is maintained throughout the remainder of the emission period, without further increasing the emitting power.

After the emission and detection of the first radiation beam 5 has been completed, the second radiation beam 6 will be emitted according to the power curve 14 from the time point t14 until the time point t16. Similarly to the case of the radiation beam 5, the radiation beam 6 is also emitted with a power level beginning from a starting value corresponding to a 100% relative emitting power. Then, the emitting power is similarly increased according to a predefined linear function (or successive functions). However, as the time-delayed associated reflected signal 15 beginning at time point t15 does not reach the predefined nominal threshold value 11, the emitting power continues to be increased, while still continuing to compare the received reflected power 15 to the nominal threshold value 11. Since the associated reflected signal 15 does not reach the nominal threshold value 11 at all, or at least not by the time point t16, therefore the emitting power of the radiation beam 6 continues to be further increased according to the predefined linear increasing function(s) throughout its entire emitting period until the time point t16. At the end of the emitting period of approximately 500 μs at the time point t16, the emitting power is switched off or dropped to zero to end the emitting period. The associated reflected signal 15 then ends after a time delay at the time point t17. Thus, the power of the second radiation beam 6 has been increased steadily up to a maximum value in order to achieve the maximum detection range, because the beam 6 did not impinge on and detect any obstacle at any lower power setting.

FIG. 3A is once again a schematic view of the motor vehicle 2 driving on the roadway 1 toward the obstacle 3, which is now closer to the vehicle 2 than the situations shown in FIGS. 1A and 2A. In view of the different beam directions of the two radiation beams 5 and 6, the radiation beam 5 impinges on the obstacle 3, while the radiation beam 6 "misses" the obstacle 3. In this regard, the invention provides for reducing the detection range of the beam 5 and increasing the detection range of the beam 6, by correspondingly reducing the emitting power of the beam 5 and increasing the emitting power of the beam 6. Such a reduction of the emitting power, when a higher power is not required for detecting the obstacle, is advantageous when the obstacle warning system 4 has reached a critical operating temperature, for example due to strong heating as a result of intense sunshine onto the motor vehicle, so that a further self-heating due to the internal dissipated power of the obstacle warning system 4 must be reduced.

More particularly, since the obstacle 3 is already closer than the normal detection range of the radiation beam 5 with its basic adjustment of a relative emitting power of 100%, the emitting power of the radiation beam 5 can be reduced without reducing the safety or reliability, and while still ensuring that the obstacle continues to be detected and recognized. In this regard, FIG. 3B shows the corresponding power curves with an emitting period of, for example, 500 μs and a starting power value of 100%. Power curve 16 shows the emitting power of the radiation beam 5, while power curve 17 shows the associated reflection. Similarly, power curve 18 shows the emitting power of the radiation beam 6, while power curve 19 shows the associated reflection. The curve or line 11 once again shows a predefined or preadjusted nominal threshold value for evaluating the reflections according to the power curves 17 and 19.

The radiation beam 5 is emitted according the power curve 16 beginning at a time point t18 with a starting value of a relative emitting power of 100%. From that starting point, the power level of the radiation beam 5 is immediately controlled according to the power change direction, function and slope specified by the predefined power variation protocol. For example, in the time interval from t18 to t19 (before receiving the reflected signal 17) the power of the radiation beam 5 could initially be increased according to an increasing linear first power function in the same manner discussed above in connection with FIG. 2B. Alternatively, if an obstacle was detected in the preceding measuring cycle, and is thus still expected to be within the normal detection range, the power level could be held constant at 100% according to a corresponding first power function in the time period from t18 to t19, i.e. until the first reflection evaluation information is obtained. This is the illustrated situation in FIG. 3B. As a further alternative embodiment, the power level of the emitting power curve 16 could already be reduced in the time period from t18 to t19 according to a different corresponding first power function, based on an obstacle having been detected in a close range in the preceding measuring cycle, so that operation with less than 100% emitting power is expected to be sufficient.

In any event, once the associated reflection of the radiation beam 5 is received after a time delay at time point t19, its received reflected power level 17 is compared with the predefined nominal threshold 11. Since the received reflected power curve 17 immediately at time t19 already exceeds the nominal threshold 11, the emitting power 16 is reduced from time point t19 until time point t20. This reduction of the emitting power level 16 proceeds according to a corresponding pre-specified second power function dependent on and triggered by the evaluation of the received reflected power 17 at time t19, regardless whether the emitting power was being increased, held constant, or reduced during the time interval from t18 to t19 according to the first power function of the prescribed power variation protocol. The power reduction from t19 to t20 proceeds linearly (or according to any other defined power variation function) as defined in the power variation protocol. Corresponding to the reduction of the emitting power, the detection range of the radiation beam 5 is also reduced, without jeopardizing or reducing the security. This is achieved because the received reflected power 17 continues to be evaluated and compared to the nominal threshold 11.

Once the received reflected power 17 drops down to the minimum required nominal threshold 11 at time t20, the emitting power 16 is not further reduced, but rather is then maintained at a constant power level, whereby it is ensured that the obstacle 3 is still detected and recognized with a sufficient received reflected power 17 at or above the required minimum threshold 11. Thus, as long as the received reflected power 17 remains at or above the threshold 11 in the time period from t20 to t21, the emitting power 16 will similarly be maintained at a constant level. If, however, the received reflected power 17 drops below the threshold 11, the emitting power 16 could once again be increased in order to try to recapture the detection of the obstacle 3. In any event, the emission period of the radiation beam 5 ends at time t21 with the emitting power dropping to zero, and the reception of the association reflected signal ends after a time delay at time t22.

Next, beginning at the time point t23 until the time point t25, the radiation beam 6 is emitted beginning with a relative emitting power of 100%, as represented by the power curve 18. From this starting value of 100% power, the emitting power 18 is linearly increased according to the applicable power variation protocol, similarly as described above. Since the associated reflection signal 19 received after a time delay at time point t24 does not reach the specified nominal threshold value 11 (e.g. because the radiation beam 6 does not impinge on any obstacle), the emitting power 18 continues to be linearly increased, similarly to the power curve 14 in FIG. 2B. Also similar to the power curve 14 in FIG. 2B, since the associated reflection 19 remains below the threshold value 11 at least until the time point t25, the emitting power 18 continues to be linearly increased until the end of the emitting period after approximately 500 $\mu$s, whereupon the emitting power is dropped to zero at time point t25. The associated reflection 19 is received with a time delay until ending at time point t26.

The reduction of the emitting power as described above in connection with FIGS. 3A and 3B further implicates another operating mode that can be used for conserving power or for emergency operation. In such an operating mode, no radiation beam or a very low-power beam is initially emitted, i.e. the emitting power is reduced to zero or a sub-normal power level. Nonetheless, the ambient lighting of the scene, and particularly strong or intense sunshine illuminating the scene including the obstacle 3, allows the obstacle warning system 4 to receive and evaluate the image information of the scene, especially when a certain portion or portions of the spectrum of the image information are evaluated. In this case, the system 4 operates initially as a passive system that cannot provide distance information regarding the obstacle 3, but instead can simply obtain and evaluate gray value images of the scene including the obstacle 3. The gray value images are evaluated by any conventionally known image recognition or evaluation processes.

If this evaluation determines or even supports an assumption with a certain probability value, that the scene in the image information includes an approaching obstacle 3 (e.g. due to the consistently increasing brightness or apparent size of a recognized obstacle), then the system 4 immediately and automatically switches to one of the normal active operating modes disclosed herein. In this manner, the system 4 can use the passive operating mode in order to conserve power or in the event of any problem causing a reduced or missing emitted radiation beam.

Figure 3A:
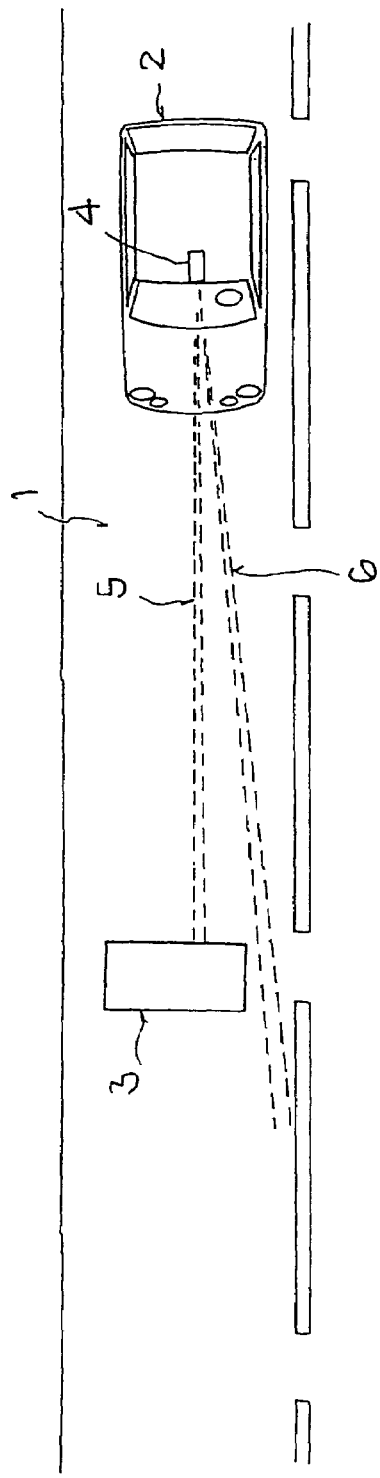
FIG. 3A is a view similar to FIG. 1A, but shows the selective reduction of the range of one radiation beam and increase of the range of the other radiation beam in comparison to the basic setting of FIG. 1A.
Figure 3B:
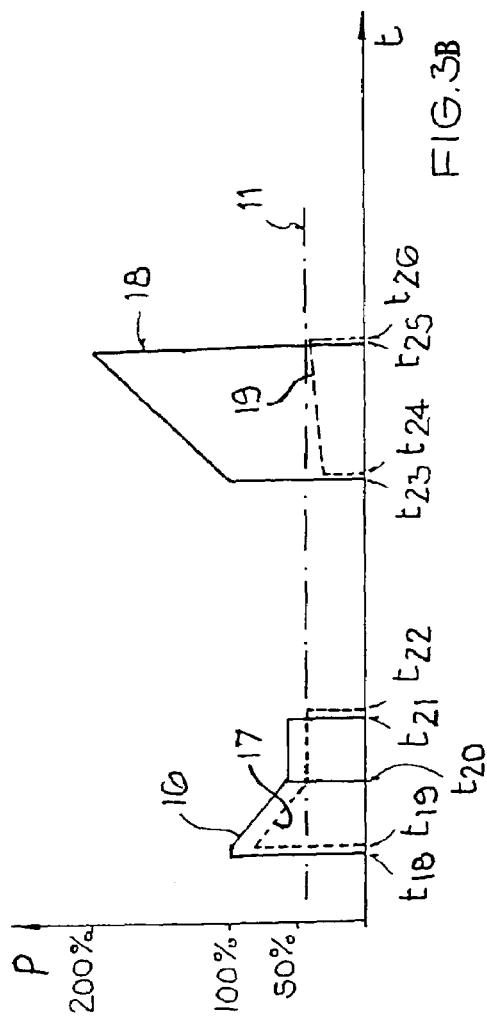
FIG. 3B is a graph of power versus time similar to FIG. 1B, but showing the reduction of the emitting power of one radiation beam and the increase of the emitting power of the other radiation beam during a given measuring cycle according to the invention in connection with FIG. 3A.
Figure 4A:
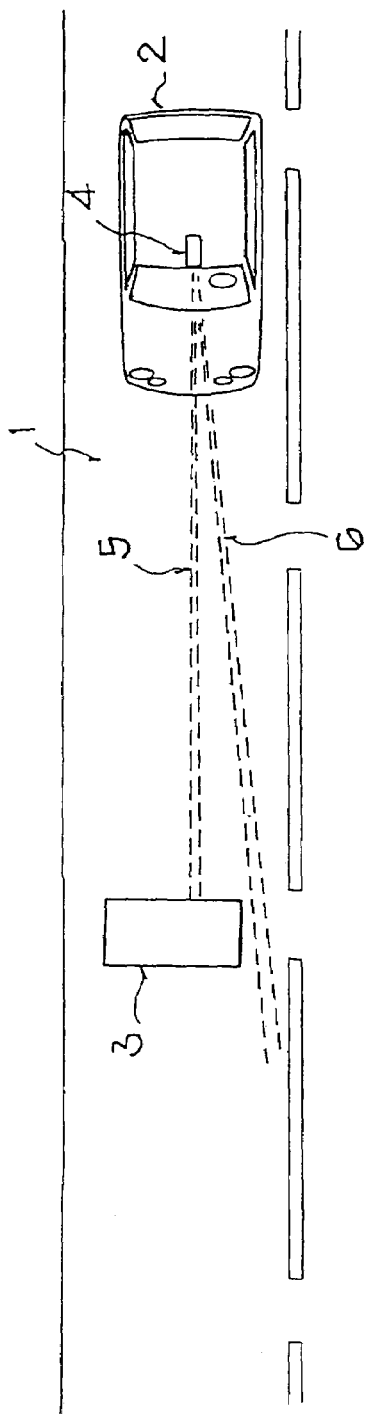
FIG. 4A is a view similar to that of FIG. 1A, but shows the increase of the range of the radiation beams of the obstacle warning system beginning from a minimum adjustment.
Figure 4B:
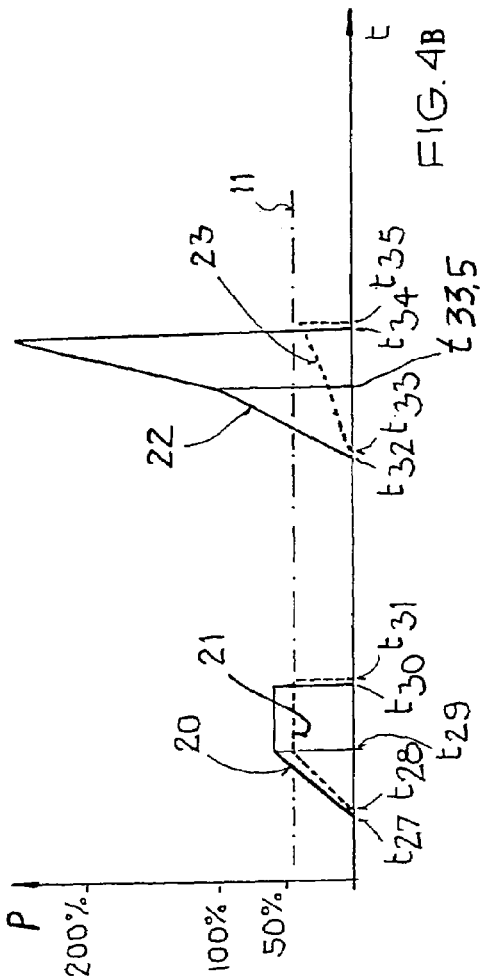
FIG. 4B is a graph of power versus time similar to that of FIG. 1B, but showing the increase of the emitting power of the two radiation beams respectively starting from a minimum or zero power value in connection with FIG. 4A.

FIG. 4A is a schematic view of the vehicle 2 operating on the roadway 1, generally corresponding to FIG. 3A. It can be seen that the obstacle 3 is in a close range to the vehicle 2, and only the radiation beam 5, but not the radiation beam 6, impinges onto the target 3. In the present example, the detection range of the radiation beams 5 and 6 will be increased starting from a minimum setting until reaching and detecting an obstacle or until the end of the emission period of approximately 500 $\mu$s. FIG. 4B shows the corresponding variation of the emitting power beginning from a minimum power of zero %. Namely, in this example the emitting power of both radiation beams 5 and 6 begins from zero power and is continuously increased, for example linearly, until either an associated reflection has been received and exceeds a predefined nominal threshold value, or the emitting period of e.g. 500 $\mu$s has elapsed, or a prescribed time has been reached. Through this operating mode, power can be conserved, and/or thereby the operating temperature of the system can be reduced (e.g. in the event of an imminent overheating condition) through the reduced power dissipation.

FIG. 4B shows that the radiation beam 5 is emitted according to the power curve 20 from time t27 through the emitting period ending at time t30. Beginning with the starting value of zero power at t27, the emitted power 20 is linearly (or according to some other function) increased in accordance with the prescribed power variation protocol. Once the associated reflection 21 is received at t28, the reflection power value is compared to the nominal threshold value 11. As long as the reflection power 21 does not reach the threshold value 11, the emitting power 20 continues to be increased, i.e. from time t27 through time t28 until time t29. By this increase of the emitting power 20, the detection range of the radiation beam 5 is correspondingly increased. Once the associated received reflected signal power 21 reaches the prescribed nominal threshold value 11 at time t29, for example because the radiation beam 5 has then reached and impinged on the obstacle 3, thereafter the emitting power 20 is not further increased, but rather is held at a constant power level, which is maintained until the end of the emitting period at time t30 so long as the received reflected signal power 21 remains at or above the threshold value 11. The associated reflection 21 ends with a time offset at the time point t31. Next, from the time point t32 until the time point t34, the second radiation beam 6 is emitted according to the power curve 22, beginning from a starting value of approximately zero for the emitting power. Thus, beginning from zero power at time t32, the emitting power 22 is increased (e.g. linearly or exponentially) according to the prescribed power variation protocol. Since the reflection power of the reflected signal 23 received after a time delay as of time t33 has not reached the prescribed nominal threshold value 11 at any time during the emitting period, the emitting power 22 continues to be increased.

Moreover, according to a further feature of the power variation protocol, if the received reflected signal power 23 has not reached the prescribed nominal threshold value 11 after the elapse of a specified time period, e.g. at time t33.5, then the rate of increase or slope of the increase of the emitting power 22 will be increased at time t33.5. This is carried out in order to more rapidly increase the detection range of the corresponding radiation beam, in an effort to ensure that no relevant obstacle goes undetected, in other words to make a best effort to detect any obstacle that might exist in the beam path of the corresponding radiation beam. In the illustrated example, even with the increased rate of increasing power, the radiation beam 6 does not impinge on and detect any obstacle. Thus, the increase of the emitting power continues until the end of the emitting period at time t34, at which the emitting power is dropped back down to zero. The time-delayed reflected signal 23 is received until the time t35 at which it ends.

It is a common feature of the several inventive examples shown and described in connection with FIGS. 2, 3 and 4, that the variation and adaptation of the emitting power is carried out in an automatic and previously prescribed manner, and thus without a direct feedback as would be typical of conventional regulation loops. While such regulation loops using feedback can only react in a delayed manner and necessarily involve a start-up transient behavior, the inventive use of a non-constant, i.e. varying, emitting power during a single respective measuring cycle is significantly simpler to realize and also reacts (or actually changes even before reacting) more quickly than the prior art systems.

By prescribing the starting value as well as the direction and change-rate or slope of the power variation in a situation-dependent manner (for example based on information obtained in previous measuring cycles and in the present measuring cycle, and based on vehicle operating conditions), the expected optimum operating point can be quickly achieved in an application-specific manner, and the emitting power and therewith also the dissipated power can be significantly reduced on average, without causing the reliability and the quality of the detection to suffer. The parameters of the power variation protocol can be defined based on operating conditions of the vehicle, such as the driving speed or the sunshine intensity. Particularly, the starting value of the emitted power and the threshold value for evaluating the received reflected signal are increased when the driving speed is over a defined speed threshold or when the sunshine intensity is over an intensity threshold, in order to enhance the system operation under such more-difficult operating conditions, while the trade-off is a higher power consumption. The invention thus provides an advantageous method of adaptively operating an active obstacle warning system for a motor vehicle, in which the emitting power of the system can be varied in a situation-dependent manner.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of detecting an obstacle, comprising the steps:
  a) emitting electromagnetic radiation in the form of a radiation beam with an emitting power into an environment to be monitored including an obstacle, during a measuring cycle having a prescribed time duration;
  b) receiving as a reflected signal a portion of said radiation beam that is reflected from said environment including said obstacle;
  c) evaluating said reflected signal to determine a presence of and a distance to said obstacle; and
  d) varying, in a situation-dependent manner, said emitting power during said prescribed time duration of said measuring cycle.

2. The method according to claim 1, wherein said varying of said emitting power comprises beginning said emitting in said measuring cycle at a prescribed starting value of said emitting power and automatically varying said emitting power thereafter according to a prescribed power variation function in said measuring cycle.

3. The method according to claim 2, further comprising comparing said reflected signal to a prescribed nominal threshold value, and wherein said varying of said emitting power comprises reducing said emitting power from said prescribed starting value according to said prescribed power variation function during said measuring cycle so long until said reflected signal reaches or falls below said prescribed nominal threshold value.

4. The method according to claim 2, further comprising comparing said reflected signal to a prescribed nominal threshold value, and wherein said varying of said emitting power comprises increasing said emitting power from said prescribed starting value according to said prescribed power variation function during said measuring cycle so long until said reflected signal reaches or exceeds said prescribed nominal threshold value.

5. The method according to claim 4, wherein said prescribed starting value is a zero power value.

6. The method according to claim 1, carried out with an obstacle warning system in a motor vehicle, wherein said varying of said emitting power comprises beginning said emitting at a prescribed starting value of said emitting power, further comprising comparing said reflected signal to a prescribed nominal threshold value, ceasing or changing said varying of said emitting power when said reflected signal reaches or passes said threshold value, and specifying said starting value and said threshold value dependent on operating conditions of said motor vehicle.

7. The method according to claim 6, wherein said operating conditions include a driving speed of said motor vehicle, and said specifying comprises increasing said starting value and said threshold value so as to increase an effective detection range of said radiation beam when said driving speed exceeds a prescribed speed threshold.

8. The method according to claim 6, wherein said operating conditions include a sunshine intensity illuminating said environment, and said specifying comprises increasing said starting value and said threshold value when said sunshine intensity exceeds a prescribed sunshine intensity threshold.

9. The method according to claim 1, wherein said emitting of said electromagnetic radiation comprises emitting successive light pulses of modulated light waves making up said radiation beam during said measuring cycle.

10. A method of detecting an obstacle, comprising the steps:
  a) emitting electromagnetic radiation in the form of a radiation beam with an emitting power into an environment to be monitored including an obstacle, during a measuring cycle having a prescribed time duration;
  b) receiving as a reflected signal a portion of said radiation beam that is reflected from said environment including said obstacle;
  c) comparing a received power level of said reflected signal to a prescribed nominal threshold value; and
  d) during said measuring cycle, controlling said emitting power according to a previously prescribed power variation protocol, including beginning said emitting with a prescribed starting value of said emitting power at a start of said measuring cycle, controlling said emitting power according to a first power function from said start of said measuring cycle until a reception time when said reflected signal is first received, and then controlling said emitting power according to a second power function beginning at said reception time, wherein said second power function is dependent on a result of said comparing in said step c) whereby said second power function involves increasing said emitting power if said received power level is initially below said prescribed nominal threshold value and involves reducing said emitting power if said received power level is initially above said prescribed nominal threshold value.

11. The method according to claim 10, wherein said first power function is previously prescribed to involve increasing said emitting power beginning from said starting value.

12. The method according to claim 10, wherein said first power function is previously prescribed to involve decreasing said emitting power beginning from said starting value.

13. The method according to claim 10, wherein said first power function is previously prescribed to involve maintaining said emitting power constant at said starting value.

14. The method according to claim 10, wherein said starting value is a zero power level.

15. The method according to claim 10, wherein said starting value is a finite positive power level.

16. The method according to claim 15, wherein said finite positive power level is specified based on information gained in a prior measuring cycle.

17. The method according to claim 10, wherein said increasing or said decreasing of said emitting power according to said second power function continues until the earlier of an end of said prescribed time duration of said measuring cycle or a control time at which said received power level reaches said prescribed nominal threshold value, at which control time a third power function of said power variation protocol commences.

18. The method according to claim 17, wherein said third power function involves maintaining said emitting power constant at a power level prevailing at said control time.

19. The method according to claim 10, further comprising increasing a rate of said increasing or said decreasing of said emitting power according to said second power function if said received power level has not reached said prescribed nominal threshold value after a specified time interval has elapsed since said reception time.

20. The method according to claim 10, further comprising a preliminary passive mode operation before said step a), comprising passively receiving and evaluating an image signal from a reflection of external illumination of said environment, and commencing said step a) when said evaluating of said image signal determines that the presence and approaching of said obstacle in said environment is probable.

21. A method of detecting an obstacle, comprising the steps:
- a) emitting electromagnetic radiation in the form of a radiation beam with an emitting power into an environment to be monitored including an obstacle, during a measuring cycle having a prescribed time duration;
- b) receiving as a reflected signal a portion of said radiation beam that is reflected from said environment including said obstacle;
- c) comparing a received power level of said reflected signal to a prescribed nominal threshold value; and
- d) varying said emitting power according to a previously prescribed power variation protocol during said measuring cycle until said step c) determines that said received power level of said reflected signal has reached said prescribed nominal threshold value.

22. The method according to claim 21, further comprising maintaining said emitting power constant during said measuring cycle following and in response to said step c) determining that said received power level of said reflected signal has reached said prescribed nominal threshold value.

23. The method according to claim 21, wherein said power variation protocol involves reducing said emitting power according to a previously defined decreasing power function while said step c) determines that said received power level of said reflected signal is above said prescribed nominal threshold value.

24. The method according to claim 21, wherein said power variation protocol involves increasing said emitting power according to a previously defined increasing power function while said step c) determines that said received power level of said reflected signal is below said prescribed nominal threshold value.

\* \* \* \* \*